US012585391B2

(12) United States Patent
Zhu et al.

(10) Patent No.: US 12,585,391 B2
(45) Date of Patent: Mar. 24, 2026

(54) MANAGING ALLOCATION OF HALF GOOD BLOCKS

(71) Applicant: Micron Technology, Inc., Boise, ID (US)

(72) Inventors: Yuqi Zhu, Milpitas, CA (US); Guang Hu, Mountain View, CA (US); Ting Luo, Santa Clara, CA (US); Xiangang Luo, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/651,781

(22) Filed: May 1, 2024

(65) Prior Publication Data

US 2024/0370181 A1    Nov. 7, 2024

Related U.S. Application Data

(60) Provisional application No. 63/463,450, filed on May 2, 2023.

(51) Int. Cl.
G06F 3/06        (2006.01)

(52) U.S. Cl.
CPC .......... G06F 3/0619 (2013.01); G06F 3/0631 (2013.01); G06F 3/064 (2013.01); G06F 3/0679 (2013.01)

(58) Field of Classification Search
CPC ...... G06F 3/0619; G06F 3/0631; G06F 3/064; G06F 3/0679
See application file for complete search history.

(56) References Cited

U.S. PATENT DOCUMENTS

| | | | |
|---|---|---|---|
| 2020/0034287 A1* | 1/2020 | Hashimoto | ........... G06F 3/0604 |
| 2021/0109856 A1* | 4/2021 | Lee | ..................... G06F 11/3037 |
| 2021/0397547 A1* | 12/2021 | Li | ...................... G06F 9/45558 |
| 2022/0066894 A1* | 3/2022 | Namala | .............. G11C 16/0483 |

* cited by examiner

*Primary Examiner* — Arpan P. Savla
*Assistant Examiner* — Jason Michael Pinga
(74) *Attorney, Agent, or Firm* — Schwegman Lundberg & Woessner, P.A.

(57) ABSTRACT

Aspects of the present disclosure configure a system component, such as a memory sub-system controller, to dynamically allocate blocks from a free block pool. The controller generates a free block pool that includes a collection of full blocks and a collection of partial good blocks (PGBs) of a set of memory components, a size of a full block in the collection of full blocks corresponding to a combination of two or more PGBs of the collection of PGBs. The controller receives a request to write data. The controller allocates an individual full block from the collection of full blocks or an individual PGB from the collection of PGBs based on determining whether the request to write the data has been received from the host device or the controller of the memory sub-system.

20 Claims, 6 Drawing Sheets

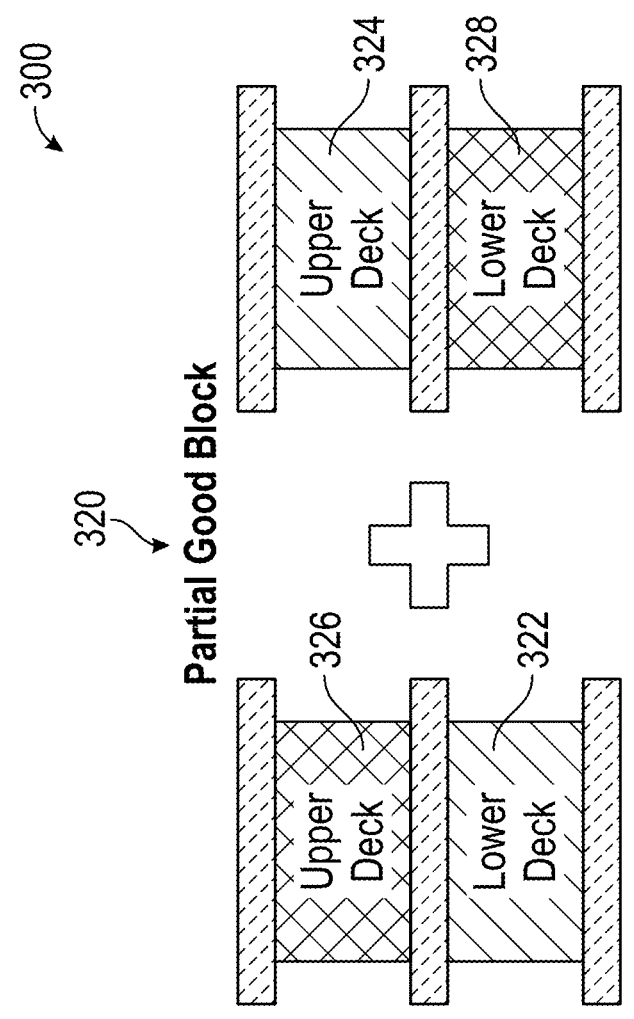
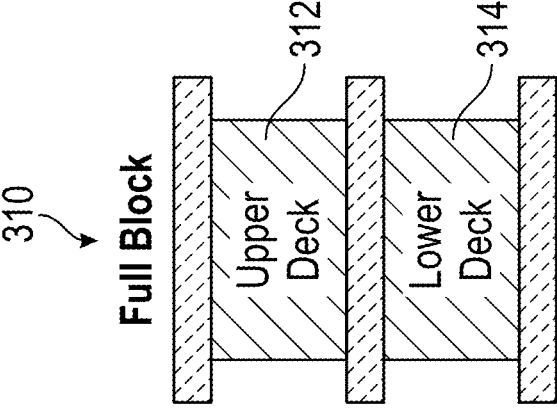
*FIG. 3*

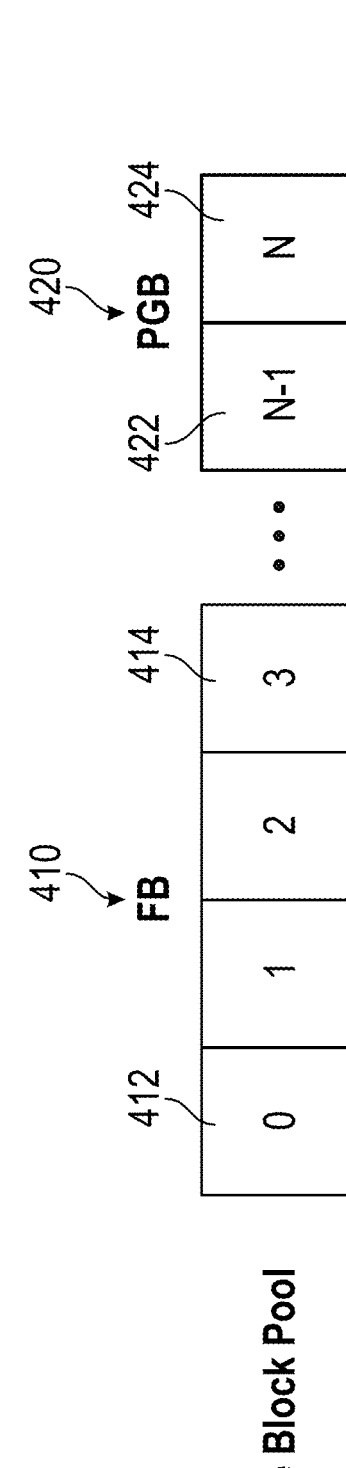
*FIG. 4*

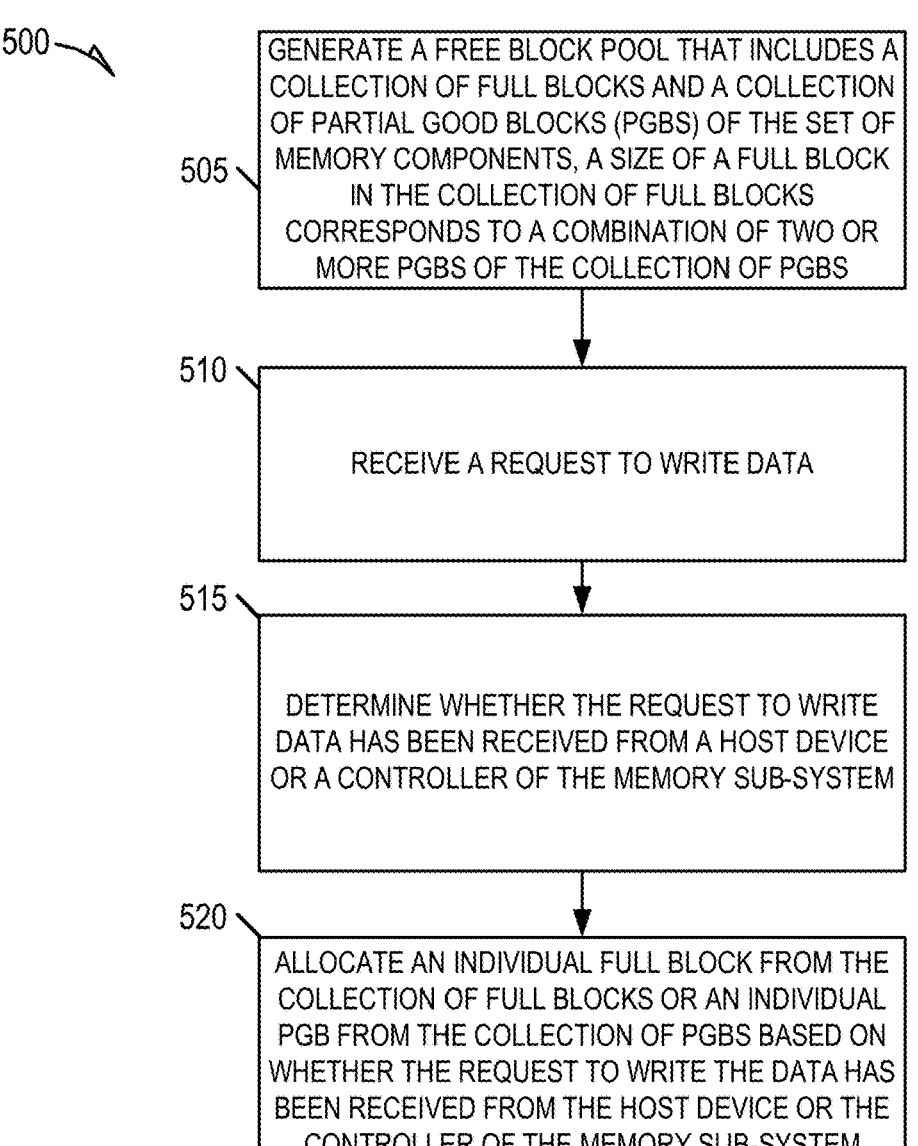

500

505 — GENERATE A FREE BLOCK POOL THAT INCLUDES A COLLECTION OF FULL BLOCKS AND A COLLECTION OF PARTIAL GOOD BLOCKS (PGBS) OF THE SET OF MEMORY COMPONENTS, A SIZE OF A FULL BLOCK IN THE COLLECTION OF FULL BLOCKS CORRESPONDS TO A COMBINATION OF TWO OR MORE PGBS OF THE COLLECTION OF PGBS

510 — RECEIVE A REQUEST TO WRITE DATA

515 — DETERMINE WHETHER THE REQUEST TO WRITE DATA HAS BEEN RECEIVED FROM A HOST DEVICE OR A CONTROLLER OF THE MEMORY SUB-SYSTEM

520 — ALLOCATE AN INDIVIDUAL FULL BLOCK FROM THE COLLECTION OF FULL BLOCKS OR AN INDIVIDUAL PGB FROM THE COLLECTION OF PGBS BASED ON WHETHER THE REQUEST TO WRITE THE DATA HAS BEEN RECEIVED FROM THE HOST DEVICE OR THE CONTROLLER OF THE MEMORY SUB-SYSTEM

*FIG. 5*

MANAGING ALLOCATION OF HALF GOOD BLOCKS

PRIORITY APPLICATION

This application claims the benefit of priority to U.S. Provisional Ser. No. 63/463,450, filed May 2, 2023, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 3 is a block diagram of example full blocks and partial good blocks (PGBs), in accordance with some implementations of the present disclosure.

FIG. 4 is a block diagram of an example free block pool, in accordance with some implementations of the present disclosure.

FIG. 5 is a flow diagram of example methods to perform memory operations to allocate blocks from a free block pool, in accordance with some implementations of the present disclosure.

DETAILED DESCRIPTION

Figure 1:
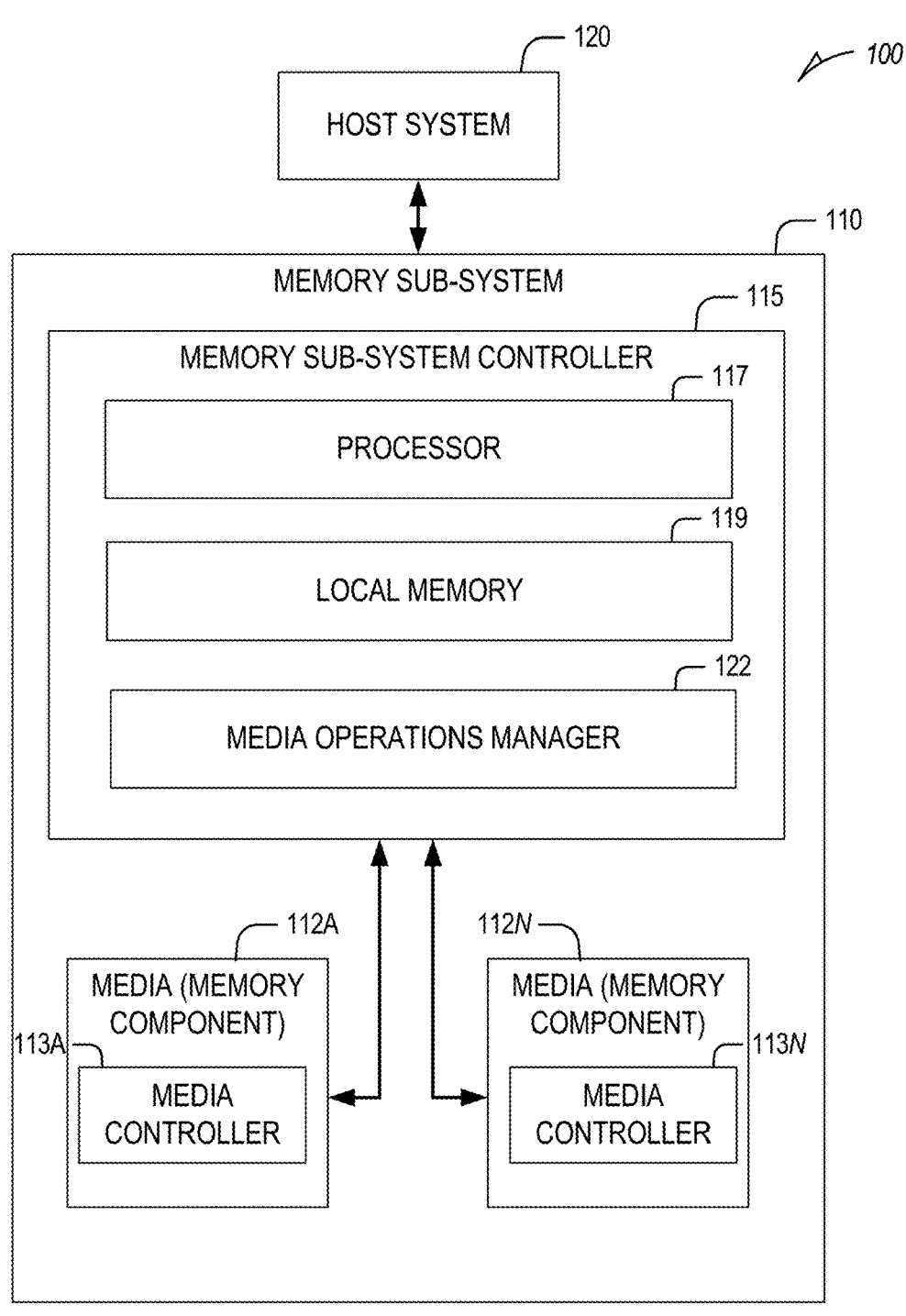
FIG. 1 is a block diagram illustrating an example computing environment including a memory sub-system, in accordance with some embodiments of the present disclosure.

Aspects of the present disclosure configure a system component, such as a memory sub-system controller, to allocate blocks that are in a free memory block pool based on whether such blocks are full blocks (FBs) or partial good blocks (PGBs). The memory sub-system controller can generate a free block pool that is divided or separated into a collection of full blocks and a collection of PGBs (or half good blocks (HGBs)). The memory sub-system controller can determine whether a request to write data to blocks that are in the free block pool is received from a host system (or device) or from an internal memory process, such as garbage collection operations. Based on this determination, the memory sub-system controller allocates blocks from the full block collection (which are programmed with a single erase operation) if the request is received from a host system and allocates blocks from the PGB collection (which are programmed with multiple erase operations) if the request is received from the internal process. By doing do, the number of erase operations that need to be performed when writing data received from a host system is reduced, which increases the overall efficiency of the memory sub-system and reduces latencies encountered by the host system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc. As part of writing data to the memory sub-system, the memory sub-system selects a block from a free block pool. The free block pool maintains blocks that contain no valid data and are ready to be erased and programmed. When data is transferred from a previous block to a new block that is in the free block pool, the new block is removed from the free block pool after being programmed with the valid data from the previous block. The previous block is then released as a new free block and added to the free block pool.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Typical memory systems leverage VBs, also referred to as superblocks or (FBs), which are a collection of blocks across multiple memory planes and/or dies. In some cases, each superblock can be of equal size and can include a respective collection of blocks across multiple planes and/or dies. The superblocks, when allocated, allow a controller to simultaneously write data to a large portion of memory spanning multiple blocks (across multiple planes and/or dies) with a single address. The VBs are usually made up of blocks from an upper deck and a lower deck of word line groups (WGRs) of the memory components. If any WGR in the upper deck is defective, the conventional systems can utilize the WGRs from the lower deck or vice versa. This can avoid wasting memory resources. In some cases, blocks from a lower deck of a first full block can be combined with blocks from an upper deck of a second full block to form a new full block. Namely, the size of a single FB can correspond to a combination of sizes of multiple partial blocks (PGBs) from different decks.

For example, in some cases a single FB can have half or less of its WGRs become defective and can be characterized as a PGB or HGB. Rather than discarding this single FB from being written or programmed, which wastes resources, such a single FB (or PGB) can be combined with another single FB (or another PGB) that has defective WGRs (e.g., half or less of its entire WGRs as defective) to form a new single FB. The new single FB can include a quantity of WGRs that correspond to a FB with no defective WGRs or that has less than a threshold quantity of defective WGRs. New data having a size corresponding to a FB can be written to this new single FB that is made up of multiple PGBs. Writing data to such FB that is made up of multiple PGBs requires two or more erase operations depending on the quantity of PGBs that are used to make up the FB. A first erase operation is performed to erase the data from a first of the multiple PGBs that make up the new FB to store a first set of the new data, and a second erase operation is performed to erase the data from a second of the multiple PGBs that make up the new FB to store a second set of the new data. While such operations improve the overall storage capacity of the memory sub-system, the need to perform two erase operations slows down and introduces latencies in servicing host write requests.

Typical systems maintain a free block pool that includes full blocks made up of a sequence of blocks from sequentially adjacent upper and lower decks of the memory components and includes PGBs that have less than a threshold quantity of non-defective WGRs. Typical systems sort blocks in the free block pool only by the respective erase counts of the blocks in the free block pool and fail to consider whether such blocks are FBs or PGBs. As a result, an individual PGB that has a smaller erase count value than all other FBs in the free block pool may be placed first in the free block pool. In such cases, when the free block pool needs to allocate an individual block to service a request to write data, such as from a host system, the free block pool selects the individual PGB that is first in the free block pool order. This individual PGB is first erased and used to store a first set of the requested data. If the requested data size exceeds the size of the non-defective WGRs of the individual PGB, an additional PGB is allocated from the free block pool and also needs to be erased first before programming the requested data. By allocating blocks from the free block pool without considering whether such blocks are FBs or PGBs, performance for servicing host write requests can be severely degraded, which adversely impacts the efficiency of the memory sub-system.

Aspects of the present disclosure address the above and other deficiencies by providing a memory controller that allocates blocks that are in a free memory block pool based on whether such blocks are FBs or PGBs. The memory controller can generate a free block pool that is divided or separated into a collection of full blocks and a collection of PGBs (or HGBs). The memory controller can determine whether a request to write data to blocks that are in the free block pool is received from a host system (or device) or from an internal memory process (e.g., firmware), such as garbage collection operations. Based on this determination, the memory controller allocates blocks from the full block collection (which are programmed with a single erase operation) if the request is received from a host system and allocates blocks from the PGB collection (which are programmed with multiple erase operations) if the request is received from the firmware. By doing do, the number of erase operations that need to be performed when writing data received from a host system is reduced, which increases the overall efficiency of the memory sub-system and reduces latencies encountered by the host system.

In some examples, the memory controller generates a free block pool that includes a collection of full blocks and a collection of PGBs of the set of memory components. A size of a full block in the collection of full blocks corresponds to a combination of two or more PGBs of the collection of PGBs. The memory controller receives a request to write data. The memory controller determines whether the request to write data has been received from a host device or a controller of the memory sub-system. The memory controller allocates an individual full block from the collection of full blocks or an individual PGB from the collection of PGBs based on whether the request to write the data has been received from the host device or the controller of the memory sub-system. In some examples, the memory controller allocates the individual full block from the collection of full blocks in response to determining that the request to write data has been received from the host device. In some examples, the memory controller allocates the individual PGB from the collection of PGBs in response to determining that the request to write data has been received from the controller of the memory sub-system.

In some examples, the request to write data corresponds to a garbage collection operation performed by the controller of the memory sub-system. In some examples, the request to write data is received during idle time of the memory sub-system. In some examples, the request to write data includes a request to write a segment of data having a size that is larger than a size of the individual PGB. In such cases, the memory controller performs a first erase operation on the individual PGB and programs a first portion of the segment of data to the individual PGB that has been erased by the first erase operation. The memory controller allocates a second PGB from the collection of PGBs and performs a second erase operation on the second PGB. The memory controller programs a second portion of the segment of data to the second PGB that has been erased by the second erase operation.

In some examples, the segment of data corresponds to valid portions of a previously used full block of the set of memory components. The memory controller, after programming the second portion of the segment of data to the second PGB, determines an erase count associated with the previously used full block and adds the previously used full block to the collection of full blocks in the free block pool based on the erase count associated with the previously used full block relative to erase counts of full blocks in the collection of full blocks.

In some examples, the segment of data corresponds to valid portions of a previously used PGB of the set of memory components. In such cases, the memory controller, after programming the second portion of the segment of data to the second PGB, determines an erase count associated with the previously used PGB and adds the previously used PGB to the collection of PGBs in the free block pool based on the erase count associated with the previously used PGB relative to erase counts of PGBs in the collection of PGBs.

In some examples, the memory controller obtains a maximum erase count value, wherein the erase count associated with the previously used PGB is computed as a sum of the maximum erase count value and a current erase count value of the previously used PGB. In some examples, the erase counts of the PGBs in the collection of PGBs are computed as sums of the maximum erase count value and respective current erase counts of the PGBS in the collection of PGBs. In some examples, the memory controller sorts the free block pool based on erase counts of the full blocks in the collection of full blocks and PGBs in the collection of PGBs in ascending order. In some examples, the memory controller arranges the free block pool such that the collection of full blocks precede the collection of PGBs to prioritize allocation of full blocks over PGBs for host write operations.

In some examples, the PGBs correspond to HGBs where two HGBs correspond to a single full block. In some examples, the memory controller determines that the request to write data has been received from the controller of the memory sub-system. The memory controller determines whether the free block pool includes any PGBs in the collection of PGBs and allocates the individual full block from the collection of full blocks in response to determining that the free block pool fails to include any PGBs in the collection of PGBs. In some examples, the memory controller sorts full blocks in the collection of full blocks separately from PGBs in the collection of PGBs based on respective ascending erase count values.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A, block or page of the first memory component 112A, or group of memory components including the first memory component 112A can be associated with a first reliability (capability) grade, value or measure. The terms "reliability grade," "value" and "measure" are used interchangeably throughout and can have the same meaning. The second memory component 112N or group of memory components including the second memory component 112N can be associated with a second reliability (capability) grade, value or measure. In some examples, each memory component 112A to 112N can store respective configuration data that specifies the respective reliability grade. In some examples, a memory or register can be associated with all of the memory components 112A to 112N, which can store a table that maps different groups, bins or sets of the memory components 112A to 112N to respective reliability grades.

In some embodiments, a PGB within the first memory component 112A can be grouped with a PGB within the second memory component 112N to form a superblock, FB, or VB that has a predetermined, reference or threshold quantity of blocks and WGRs. FBs or VBs can be addressed collectively using a single address. In such cases, a logical-to-physical address (LTP or L2P) table can store the association between the single address and each of the PGBs of the first memory component 112A and second memory component 112N associated with that single address. In some examples, some of the WGRs of a given block within the first memory component 112A can have reliability grades that are below a threshold or can be characterized as defective or non-defective. Such blocks can be processed to determine whether a quantity of the WGRs that are non-defective relative to the total quantity of WGRs of the block is greater a minimum or reference percentage threshold. Alternatively, or in addition, such blocks can be processed to determine whether a quantity of the WGRs that are defective relative to the total quantity of WGRs of the block is below a minimum or reference percentage threshold. If the quantity of the WGRs that are non-defective relative to the total quantity of WGRs of the block is greater a minimum or reference percentage threshold, such as block is marked as a PGB and can be used to form a VB or FB. A memory or table can be generated to list the PGBs and their respective WGRs that are defective or non-defective. Sometimes PGBs are referred to as HGBs depending on the quantity of non-defective pages, blocks, and/or WGRs that are included in the PGB.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120.

Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased.

Furthermore, the memory cells of the memory components 112A to 112N can be grouped as memory pages or blocks that can refer to a unit of the memory component 112 used to store data. For example, a single first row that spans memory components 112A to 112N can correspond to or be grouped as a first superblock and a single second row that spans memory components 112A to 112N can correspond to or be grouped as a second superblock. If the single first row includes all good blocks (e.g., each block in the single first row has a reliability grade above a threshold), the first superblock is a first complete superblock. If the single first row includes some bad blocks (e.g., one or more blocks in the single first row have a reliability grade below a threshold), the first superblock is a first incomplete superblock.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, garbage collection operations, different read disturb management, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the reliability grades and/or indications of defects in certain WGRs associated with different groups of the memory components 112N to 112N and/or different blocks within each of the memory components 112N to 112N. In some cases, the reliability grades are dynamic and can be updated by the memory sub-system controller 115 in response to determining that certain error rates are reached that transgress an error rate threshold. For example, a non-defective WGR can become a defective WGR if that non-defective WGR starts having error rates that transgress the threshold. In such cases, the configuration data is updated and any VB that includes that now defective WGR is updated with a replacement or spare PGB to maintain performance of the VB above a minimum or reference performance rating.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to manage a free block pool and to allocate blocks from the free block pool for programming or writing data on the basis of whether a request to write the data is received from the host system 120 or the firmware of the memory sub-system 110. For example, the media operations manager 122 can generate a free block pool that includes a collection of full blocks (e.g., that include more than a threshold quantity of non-defective WGRs, pages, or blocks) and a collection of PGBs of the set of memory components (e.g., that each include less than the threshold quantity of non-defective WGRs, pages, or blocks making them each capable of storing less data than any one of the FBs). Namely, a size of a full block in the collection of full blocks corresponds to a combination of two or more PGBs of the collection of PGBs. The memory sub-system controller 115 can receive a request to write data, such as from the host system 120 or the firmware of the memory sub-system 110. The memory sub-system controller 115 determines whether the request to write data has been received from the host system 120 or the firmware of the memory sub-system 110. The memory sub-system controller 115 allocates an individual full block from the collection of full blocks or an individual PGB from the collection of PGBs based on whether the request to write the data has been received from the host system 120 or the firmware. In some examples, the memory sub-system controller 115 allocates the individual full block from the collection of full blocks in response to determining that the request to write data has been received from the host system 120. In some examples, the memory sub-system controller 115 allocates the individual PGB from the collection of PGBs in response to determining that the request to write data has been received from the firmware.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
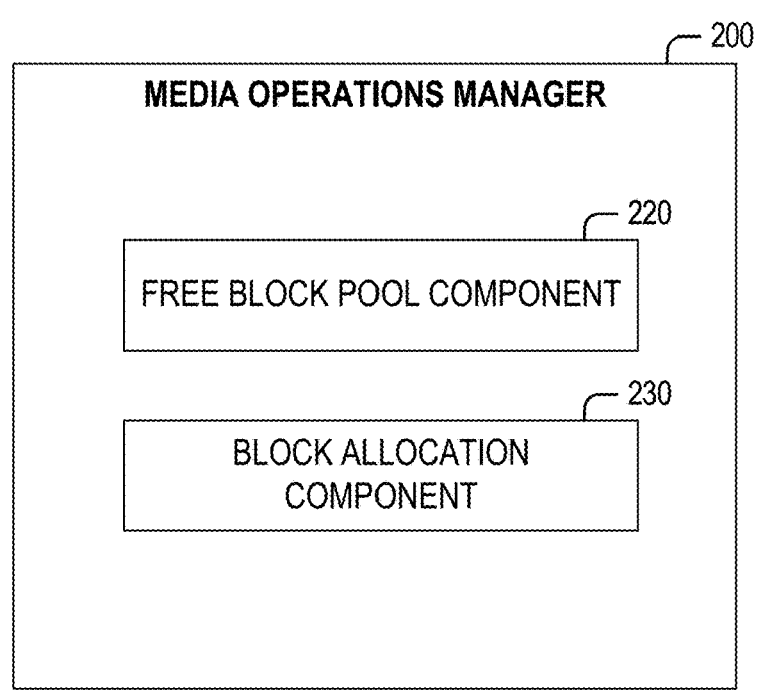
FIG. 2 is a block diagram of an example media operations manager, in accordance with some implementations of the present disclosure.

FIG. 2 is a block diagram of an example media operations manager 200, in accordance with some implementations of the present disclosure. The media operations manager 200 can include some or all of the components of the media operations manager 122 shown in FIG. 1. As illustrated, the media operations manager 200 includes free block pool component 220 and a block allocation component 230. For some embodiments, the media operations manager 122 can differ in components or arrangement (e.g., less or more components) from what is illustrated in FIG. 2.

The free block pool component 220 maintains a list of blocks that include invalid data and that are ready to be programmed. The free block pool component 220 can store an indication with each block in the list of blocks specifying whether the block is a PGB or is a FB. For example, as shown in the diagram 300 of FIG. 3, the free block pool component 220 can receive a full block 310 that includes less than a threshold quantity of defective blocks, pages, and/or WGRs. The full block 310 includes blocks, pages, and/or WGRs in an upper deck 312 and blocks, pages, and/or WGRs in a lower deck 314. The upper deck 312 includes less than a first threshold quantity of defective blocks, pages, and/or WGRs, and the lower deck 314 includes less than a second threshold quantity of defective blocks, pages, and/or WGRs. The upper deck 312 can be physically adjacent to the lower deck 314 in the full block 310. The free block pool component 220 can add the full block 310 to a collection of FBs in the free block pool, as discussed below.

In some examples, the free block pool component 220 can receive a PGB 320 that includes more than the threshold quantity of defective blocks, pages, and/or WGRs. The PGB 320 includes blocks, pages, and/or WGRs in an upper deck 326 and blocks, pages, and/or WGRs in a lower deck 322. The upper deck 326 can include more than the first threshold quantity of defective blocks, pages, and/or WGRs, and the lower deck 322 can include less than the second threshold quantity of defective blocks, pages, and/or WGRs. In some cases, the upper deck 324 of the PGB 320 can includes less than the first threshold quantity of defective blocks, pages, and/or WGRs, and the lower deck 328 can include more than the second threshold quantity of defective blocks, pages, and/or WGRs. The free block pool component 220 can add the PGB 320 to a collection of PGBs in the free block pool, as discussed below. In some cases, two PGBs can be combined to enable storage or writing of data having a size corresponding to the size of the full block 310. In such cases, the lower deck 322 (e.g., of a first of the two PGBs) can be separated and not physically adjacent to the upper deck 324 (e.g., of a second of the two PGBs) that are logically addressed to correspond to a single FB.

The free block pool component 220 can collect all of the blocks associated with the PGB indication into a collection of PGBs and can collect all of the remaining blocks (e.g., those without the PGB indication) into a collection of FBs. Each of these collections of blocks is managed and sorted separately and independently from each other.

In some examples, the free block pool component 220 accesses an erase count value indicating the number of times each PGB in the collection of PGBs has been erased. The free block pool component 220 can then sort, arrange or organize the PGBs in the collection of PGBs based on the respective erase count values. In some cases, the PGB with the smallest erase count value is placed at a head of a queue or first in the collection of PGBs. The PGB with the largest erase count value is placed at a tail of a queue or last in the collection of PGBs. For example, as shown in FIG. 4, a free block pool 400 can be maintained by the free block pool component 220. The free block pool 400 can include a collection of PGBs 420 (e.g., HGBs). The PGB 422 with the smallest erase count value is placed at a head of a queue or first in the collection of PGBs 420. The PGB 424 with the largest erase count value is placed at a tail of a queue or last in the collection of PGBs 420.

Similarly, the free block pool component 220 accesses an erase count value indicating the number of times each FB in the collection of FBs has been erased. The free block pool component 220 can then sort, arrange or organize the FBs in the collection of FBs based on the respective erase count values. In some cases, the FB with the smallest erase count value is placed at a head of a queue or first in the collection of FBs. The FB with the largest erase count value is placed at a tail of a queue or last in the collection of FBs. For example, as shown in FIG. 4, the free block pool 400 can include a collection of FBs 410. The FB 412 with the smallest erase count value is placed at a head of a queue or first in the collection of FBs 410. The FB 414 with the largest erase count value is placed at a tail of a queue or last in the collection of FBs 410. As a result, the collection of FBs 410 has a FB with the smallest erase count value among all of the FBs in the collection at the front of the list and the collection of PGBs 420 has a PGB with the smallest erase count value among all of the PGBs in the collection at the front of the list. The erase count value associated with the PGB at the front of the list of the collection of PGBs may have a smaller erase count value than that of the FB at the front of the list of the collection of FBs.

In some cases, the collection of FBs 410 and the collection of PGBs 420 are all stored in the same list. In such cases, the collection of PGBs 420 is placed after the collection of FBs 410 in the same list. In some examples, to organize the same list in this manner, the free block pool component 220 first computes the erase count values for each FB and each PGB. The free block pool component 220 obtains a maximum erase count value or predetermined erase count value. This maximum erase count value can be greater than any possible erase count value that can be associated with a FB. The free block pool component 220 adds this maximum or predetermined erase count value to the erase count value of each PGB. In this way, each PGB will be associated with an erase count value that is greater than the erase count value of any FB. The free block pool component 220 can then sort the FBs and the PGBs in the same list based on the associated erase count values. Because the PGBs have erase count values that have been incremented by the maximum erase count value, all of the PGBs will be placed in the list after the FBs.

The block allocation component 230 can receive and process write requests from the host system 120 and/or the firmware of the memory sub-system 110. In some cases, the block allocation component 230 receives a write request from the host system 120. In response, the block allocation component 230 communicates with the free block pool component 220 to obtain and allocate an individual block from the free block pool. For example, the block allocation component 230 can obtain a block, such as a FB 412, that is at the head or top of the list of free blocks. In some cases, the block allocation component 230 can obtain from the free block pool component 220 an individual block from the collection of FBs in response to determining that the write request has been received from the host system 120. In this way, whenever a request to write data is received from the host system 120, the data can be written to a FB that can be programmed with a single erase operation if a FB is available at all in the free block pool. This reduces latencies encountered by the host system 120 and improves the overall efficiency of the memory sub-system 110.

While performing background operations when the memory sub-system 110 is idle, the block allocation component 230 can receive a request to perform a write operation from the firmware. For example, as part of performing garbage collection, the firmware may need to access a free block from the free block pool in order to copy over valid data from a previously used block that has some valid and some invalid data that is currently in garbage collection. The firmware may request a block from the block allocation component 230. The block allocation component 230 can, in response to determining that the request to write data is received from the firmware, search the free block pool stored by the free block pool component 220 for one or more PGBs from the collection of PGBs.

If the block allocation component 230 determines that a PGB is available and exists in the free block pool, such as in the collection of PGBs, the block allocation component 230 allocates the PGB 422 that is at the front of the list of the PGBs from the free block pool component 220. The allocated PGB is then used as a target block in which at least a portion of the valid data from the previously used block is copied over. The block allocation component 230 performs a first erase operation on the allocated PGB 422 and stores the at least the portion of the valid data from the previously used block into the now erased PGB block. If the size of the valid data exceeds the size of the allocated PGB, the block allocation component 230 allocates an additional PGB 424 from the collection of PGBs 420 if one exists. The block allocation component 230 performs a second erase operation on the allocated additional PGB 424 and stores the remaining portion of the valid data from the previously used block into the now erased PGB 424.

After completing the transfer of the data from the previously used block into one or more PGBs of the collection of PGBs 420, the block allocation component 230 provides the previously used block to the free block pool component 220 to add the previously used block as a released block into the free block pool. The free block pool component 220 computes the erase count value of the previously used block and inserts the previously used block into the free block pool based on the erase count value, as discussed above. If the previously used block is a PGB, the free block pool component 220 adjusts the erase count value of the previously used PGB by adding the maximum erase count value threshold to the computed erase count value of the previously used block. The free block pool component 220 then adds the previously used block to the collection of PGBs 420 based on the adjusted erase count value in relation to adjusted erase count values of other PGBs in the collection (e.g., the erase count values incremented by the maximum erase count value threshold), such as in ascending order. If the previously used block is a FB, the free block pool component 220 adds the previously used block to the collection of FBs based on its erase count value in relation to the erase count values of the FBs in the collection in ascending order.

In some cases, the block allocation component 230 determines that a PGB is not available and does not exist in the free block pool, such as in the collection of PGBs 420. In such circumstances, the block allocation component 230 allocates a FB 412 that is at the front of the list of the FBs 410 from the free block pool component 220. The FB 412 that has been allocated is then used as a target block in which the valid data from the previously used block is copied over. The block allocation component 230 performs a single erase operation on the FB 412 and stores the valid data from the previously used block into the now erased FB 412. After completing the transfer of the data from the previously used block into the FB 412 of the collection of FBs, the block allocation component 230 provides the previously used block to the free block pool component 220 to add the previously used block as a released block into the free block pool.

FIG. 5 is a flow diagram of an example method 500 to perform memory operations to allocate blocks from a free block pool, in accordance with some implementations of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the media operations manager 122 of FIG. 1. Although the processes are shown in a particular sequence or order, unless otherwise specified, the order of the processes can be modified. Thus, the illustrated embodiments should be understood only as examples. The illustrated processes can be performed in a different order, and some processes can be performed in parallel. Additionally, one or more processes can be omitted in various embodiments. Thus, not all processes are required in every embodiment. Other process flows are possible.

Referring now FIG. 5, the method (or process) 500 begins at operation 505, with a media operations manager 122 of a memory sub-system (e.g., memory sub-system 110) generating a free block pool that includes a collection of full blocks and a collection of PGBs (or half good blocks (HGBs)) of the set of memory components 112A-112N, a size of a full block in the collection of full blocks corresponding to a combination of two or more PGBs of the collection of PGBs. At operation 510, the media operations manager 122 receives a request to write data. The media operations manager 122, at operation 515, determines whether the request to write data has been received from a host device or a controller of the memory sub-system. Then, at operation 520, the media operations manager 122 allocates an individual full block from the collection of full blocks or an individual PGB from the collection of PGBs based on whether the request to write the data has been received from the host device or the controller of the memory sub-system.

In view of the disclosure above, various examples are set forth below. It should be noted that one or more features of an example, taken in isolation or combination, should be considered within the disclosure of this application.

Example 1. A system comprising: a set of memory components of a memory sub-system; and a processing device operatively coupled to the set of memory components, the processing device being configured to perform operations comprising: generating a free block pool that includes a collection of full blocks and a collection of partial good blocks (PGBs) of the set of memory components, a size of a full block in the collection of full blocks corresponding to a combination of two or more PGBs of the collection of PGBs; receiving a request to write data; determining whether the request to write data has been received from a host device or a controller of the memory sub-system; and allocating an individual full block from the collection of full blocks or an individual PGB from the collection of PGBs based on whether the request to write the data has been received from the host device or the controller of the memory sub-system.

Example 2. The system of Example 1, the operations comprising: allocating the individual full block from the collection of full blocks in response to determining that the request to write data has been received from the host device.

Example 3. The system of any one of Examples 1-2, the operations comprising: allocating the individual PGB from the collection of PGBs in response to determining that the request to write data has been received from the controller of the memory sub-system.

Example 4. The system of Example 3, wherein the request to write data corresponds to a garbage collection operation performed by the controller of the memory sub-system.

Example 5. The system of any one of Examples 3-4, wherein the request to write data is received during idle time of the memory sub-system.

Example 6. The system of any one of Examples 3-5, wherein the request to write data comprises a request to write a segment of data having a size that is larger than a size of the individual PGB, the operations comprising: performing a first erase operation on the individual PGB; programming a first portion of the segment of data to the individual PGB that has been erased by the first erase operation; allocating a second PGB from the collection of PGBs; performing a second erase operation on the second PGB; and programming a second portion of the segment of data to the second PGB that has been erased by the second erase operation.

Example 7. The system of Example 6, wherein the segment of data corresponds to valid portions of a previously used full block of the set of memory components, the operations comprising: after programming the second portion of the segment of data to the second PGB: determining an erase count associated with the previously used full block; and adding the previously used full block to the collection of full blocks in the free block pool based on the erase count associated with the previously used full block relative to erase counts of full blocks in the collection of full blocks.

Example 8. The system of any one of Examples 6-7, wherein the segment of data corresponds to valid portions of a previously used PGB of the set of memory components, the operations comprising: after programming the second portion of the segment of data to the second PGB: determining an erase count associated with the previously used PGB; and adding the previously used PGB to the collection of PGBs in the free block pool based on the erase count associated with the previously used PGB relative to erase counts of PGBs in the collection of PGBs.

Example 9. The system of Example 8, the operations comprising: obtaining a maximum erase count value, wherein the erase count associated with the previously used PGB is computed as a sum of the maximum erase count value and a current erase count value of the previously used PGB.

Example 10. The system of Example 9, wherein erase counts of the PGBs in the collection of PGBs are computed as sums of the maximum erase count value and respective current erase counts of the PGBS in the collection of PGBs.

Example 11. The system of Example 10, the operations comprising: sorting the free block pool based on erase counts of the full blocks in the collection of full blocks and PGBs in the collection of PGBs in ascending order.

Example 12. The system of any one of Examples 1-11, the operations comprising: arranging the free block pool such that the collection of full blocks precede the collection of PGBs to prioritize allocation of full blocks over PGBs for host write operations.

Example 13. The system of any one of Examples 1-12, wherein the PGBs correspond to half good blocks (HGBs) where two HGBs correspond to a single full block.

Example 14. The system of any one of Examples 1-13, the operations comprising: determining that the request to write data has been received from the controller of the memory sub-system; determining whether the free block pool includes any PGBs in the collection of PGBs; and allocating the individual full block from the collection of full blocks in response to determining that the free block pool fails to include any PGBs in the collection of PGBs.

Example 15. The system of any one of Examples 1-14, the operations comprising: sorting full blocks in the collection of full blocks separately from PGBs in the collection of PGBs based on respective ascending erase count values.

Methods and computer-readable storage medium with instructions for performing any one of the above Examples.

Figure 6:
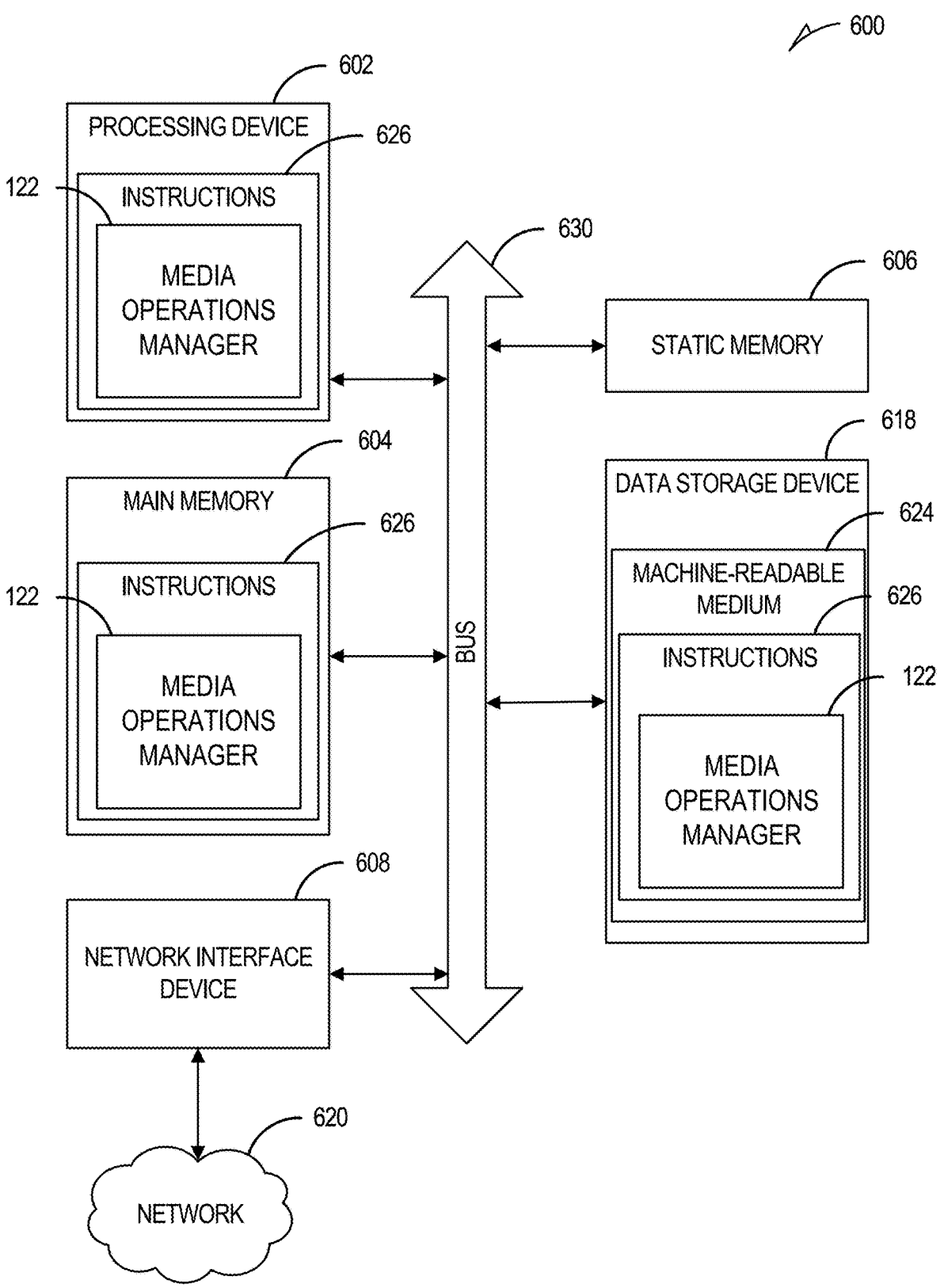
FIG. 6 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage device 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader embodiments of the disclosure as set forth in the following claims. The specification and drawings are, accordingly, to be regarded in an illustrative sense rather than a restrictive sense.

What is claimed is:

1. A system comprising:

a set of memory components of a memory sub-system; and a processing device operatively coupled to the set of memory components, the processing device being programmed to perform operations comprising:

generating a free block pool that includes a plurality of full blocks and a plurality of partial good blocks (PGBs) of the set of memory components, a size of a full block in the plurality of full blocks corresponding to a combination of two or more PGBs of the plurality of PGBs, each PGB of the plurality of PGBs comprising one or more defective word line groups (WGRs), and an individual PGB being included as part of the plurality of PGBs based on a determination that a quantity of the one or more defective WGRs in the individual PGB relative to a total quantity of WGRs in the individual PGB is below a reference threshold value;

obtaining a maximum erase count value, an erase count associated with a previously used PGB comprising the individual PGB being computed as a sum of the maximum erase count value and a current erase count value of the previously used PGB;

receiving a request to write data;

determining whether the request to write data has been received from a host device or a controller of the memory sub-system; and allocating an individual full block from the plurality of full blocks or the individual PGB from the plurality of PGBs based on whether the request to write the data has been received from the host device or the controller of the memory sub-system.

2. The system of claim 1, the operations comprising:

allocating the individual full block from the plurality of full blocks in response to determining that the request to write data has been received from the host device.

3. The system of claim 1, the operations comprising:

allocating the individual PGB from the plurality of PGBs in response to determining that the request to write data has been received from the controller of the memory sub-system.

4. The system of claim 3, wherein the request to write data corresponds to a garbage collection operation performed by the controller of the memory sub-system.

5. The system of claim 3, wherein the request to write data is received during idle time of the memory sub-system.

6. The system of claim 3, wherein the request to write data comprises a request to write a segment of data having a size that is larger than a size of the individual PGB, the operations comprising:

performing a first erase operation on the individual PGB;

programming a first portion of the segment of data to the individual PGB that has been erased by the first erase operation;

allocating a second PGB from the plurality of PGBs;

performing a second erase operation on the second PGB; and programming a second portion of the segment of data to the second PGB that has been erased by the second erase operation.

7. The system of claim 6, wherein the segment of data corresponds to valid portions of a previously used full block of the set of memory components, the operations comprising:

after programming the second portion of the segment of data to the second PGB:

19

20 determining an erase count associated with the previously used full block; and adding the previously used full block to the plurality of full blocks in the free block pool based on the erase count associated with the previously used full block relative to erase counts of full blocks in the plurality of full blocks.

8. The system of claim 6, wherein the segment of data corresponds to valid portions of a previously used PGB of the set of memory components, the operations comprising:

after programming the second portion of the segment of data to the second PGB:

determining an erase count associated with the previously used PGB; and adding the previously used PGB to the plurality of PGBs in the free block pool based on the erase count associated with the previously used PGB relative to erase counts of PGBs in the plurality of PGBs.

9. The system of claim 1, wherein erase counts of the PGBs in the plurality of PGBs are computed as sums of the maximum erase count value and respective current erase counts of the PGBs in the plurality of PGBs.

10. The system of claim 9, the operations comprising:

sorting the free block pool based on erase counts of the full blocks in the plurality of full blocks and PGBs in the plurality of PGBs in ascending order.

11. The system of claim 1, the operations comprising:

arranging the free block pool such that the plurality of full blocks precede the plurality of PGBs to prioritize allocation of full blocks over PGBs for host write operations.

12. The system of claim 1, wherein the PGBs correspond to half good blocks (HGBs) where two HGBs correspond to a single full block.

13. The system of claim 1, the operations comprising:

determining that the request to write data has been received from the controller of the memory sub-system;

determining whether the free block pool includes any PGBs in the plurality of PGBs; and allocating the individual full block from the plurality of full blocks in response to determining that the free block pool fails to include any PGBs in the plurality of PGBs.

14. The system of claim 1, the operations comprising:

sorting full blocks in the plurality of full blocks separately from PGBs in the plurality of PGBs based on respective ascending erase count values.

15. A method comprising:

generating a free block pool that includes a plurality of full blocks and a plurality of partial good blocks (PGBs) of a set of memory components, a size of a full block in the plurality of full blocks corresponding to a combination of two or more PGBs of the plurality of PGBs, each PGB of the plurality of PGBs comprising one or more defective word line groups (WGRs), and an individual PGB being included as part of the plurality of PGBs based on a determination that a quantity of the one or more defective WGRs in the individual PGB relative to a total quantity of WGRs in the individual PGB is below a reference threshold value;

obtaining a maximum erase count value, an erase count associated with a previously used PGB comprising the individual PGB being computed as a sum of the maximum erase count value and a current erase count value of the previously used PGB;

receiving a request to write data;

determining whether the request to write data has been received from a host device or a controller of a memory sub-system; and allocating an individual full block from the plurality of full blocks or the individual PGB from the plurality of PGBs based on whether the request to write the data has been received from the host device or the controller of the memory sub-system.

16. The method of claim 15, comprising:

processing a set of blocks to determine whether a quantity of WGRs that are non-defective relative to a total quantity of WGRs of each block in the set of blocks is greater than a minimum percentage threshold;

marking blocks in the set of blocks as PGBs when the quantity of non-defective WGRs relative to the total quantity of WGRs is greater than the minimum percentage threshold;

generating a table listing the PGBs and their respective WGRs that are defective or non-defective based on a result of marking the blocks in the set of blocks; and allocating the individual full block from the plurality of full blocks in response to determining that the request to write data has been received from the host device.

17. The method of claim 15, comprising:

allocating the individual PGB from the plurality of PGBs in response to determining that the request to write data has been received from the controller of the memory sub-system.

18. A non-transitory computer-readable storage medium comprising instructions that, when executed by a processing device, cause the processing device to perform operations comprising:

generating a free block pool that includes a plurality of full blocks and a plurality of partial good blocks (PGBs) of a set of memory components, a size of a full block in the plurality of full blocks corresponding to a combination of two or more PGBs of the plurality of PGBs, each PGB of the plurality of PGBs comprising one or more defective word line groups (WGRs), and an individual PGB being included as part of the plurality of PGBs based on a determination that a quantity of the one or more defective WGRs in the individual PGB relative to a total quantity of WGRs in the individual PGB is below a reference threshold value;

obtaining a maximum erase count value, an erase count associated with a previously used PGB comprising the individual PGB being computed as a sum of the maximum erase count value and a current erase count value of the previously used PGB;

receiving a request to write data;

determining whether the request to write data has been received from a host device or a controller of a memory sub-system; and allocating an individual full block from the plurality of full blocks or the individual PGB from the plurality of PGBs based on whether the request to write the data has been received from the host device or the controller of the memory sub-system.

19. The non-transitory computer-readable storage medium of claim 18, the operations comprising allocating the individual PGB from the plurality of PGBs in response to determining that the request to write data has been received from the controller of the memory sub-system.

20. The non-transitory computer-readable storage medium of claim 18, the operations comprising sorting full blocks in the plurality of full blocks separately from PGBs in the plurality of PGBs based on respective ascending erase count values.

* * * * *